United States Patent [19]

Takano

[11] Patent Number: 5,650,818
[45] Date of Patent: Jul. 22, 1997

[54] LINEAR SENSOR CAMERA AND METHOD FOR PROCESSING THE TRANSMISSION DATA THEREIN

[75] Inventor: Tokio Takano, Tokyo, Japan

[73] Assignee: Samsung Aerospace Industries, Ltd., Kyungsangnam-do, Rep. of Korea

[21] Appl. No.: 602,012

[22] Filed: Feb. 15, 1996

[30] Foreign Application Priority Data

Feb. 16, 1995 [JP] Japan ................................ 7-028311

[51] Int. Cl.$^6$ ............................................. H04N 5/228
[52] U.S. Cl. ................................. 348/222; 348/255
[58] Field of Search .......................... 348/222, 255; H04N 5/228, 5/20

[56] References Cited

U.S. PATENT DOCUMENTS 5,321,509  6/1994  Kannegundla ........................ 348/222

Primary Examiner—Sherrie Hsia
Attorney, Agent, or Firm—Finnegan, Henderson, Farabow, Garrett & Dunner, L.L.P.

[57] ABSTRACT

A linear sensor camera comprises an image information converter for receiving image information, electronically scanning the image information, and converting the scanned image information into an electric signal having a regular period. The spatial frequency modulation of the electric signal output from the image information converter is determined for one scanning period, and the quantity of the electric signal is controlled in accordance with the spatial frequency modulation determination. When the spatial frequency modulation is low, the quantity of the outputted electric signal is decreased, thereby permitting the image information processing speed to be increased.

7 Claims, 5 Drawing Sheets

LINEAR SENSOR CAMERA AND METHOD FOR PROCESSING THE TRANSMISSION DATA THEREIN

BACKGROUND OF THE INVENTION

1. Field of the Invention

The present invention is directed to a linear sensor camera which gives a very precise digital image, and an effective method for processing transmission data in a linear sensor camera.

2. Discussion of the Related Art

Conventional area sensors that convert received image information into electric signals have difficulty in obtaining a clear image when receiving, for example, TV image signals. This is particularly due to the fact that an insufficient number of pixels is provided to generate a character or a graphic character image.

Conventional linear sensors, when operated in a scanner, fox example, are normally used by a camera to capture an image of a character or a graphic character image. Linear sensors have a much higher resolution than area sensors, because they can capture the image data in thousands of pixels in one scanning period.

In image recognition by a linear sensor, horizontal scanning (X-axis direction) is performed, much like a CCD, which comprises a linear sensor, and subscanning (Y-axis direction) is performed, much like a pulse motor which moves a linear sensor and image information relatively in X and Y directions.

A problem occurring in conventional linear sensor cameras having a linear sensor is that the processing speed of the image output, which processes the image data, is slowed due to an inevitable increase in the quantity of image data.

This problem can be solved by digitizing the image data according to the resolution of the linear sensor and arranging the digitized data according to the spatial frequency composition of the image information. However, in accomplishing this the image data processing becomes too complex, the memory capacity required to store the image data becomes too large, and the amount of time that the image data needs to be stored becomes long. As a result, the overall processing time of the image data increases.

Accordingly, such a technique can be used effectively only on slower-type devices, such as scanners, but cannot be used effectively on faster-type devices, such as cameras.

SUMMARY OF THE INVENTION

The present invention has been made in view of the above circumstances and has as an object to provide a linear sensor camera having accelerated output image processing as compared the prior art.

Additional objects and advantages of the invention will be sen forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a linear camera comprises image information conversion means for receiving image information, electronically scanning the image information, and converting the scanned image information into an electric signal having a regular period, frequency characteristic judging means for determining a spatial frequency modulation of the electric signal output from the image information conversion means for one scanning period, means for changing a quantity of the electric signal according to the spatial frequency modulation determination by the frequency characteristic judging means, and means for outputting the electric signal in a quantity as changed by the changing means.

BRIEF DESCRIPTION OF THE DRAWINGS

The accompanying drawings, which are incorporated in and constitute a part of this specification illustrate a preferred embodiment of the invention and, together with the description, serve to explain the objects, advantages and principles of the invention. In the drawings.

DETAILED DESCRIPTION OF THE PREFERRED EMBODIMENTS

Figure 1:
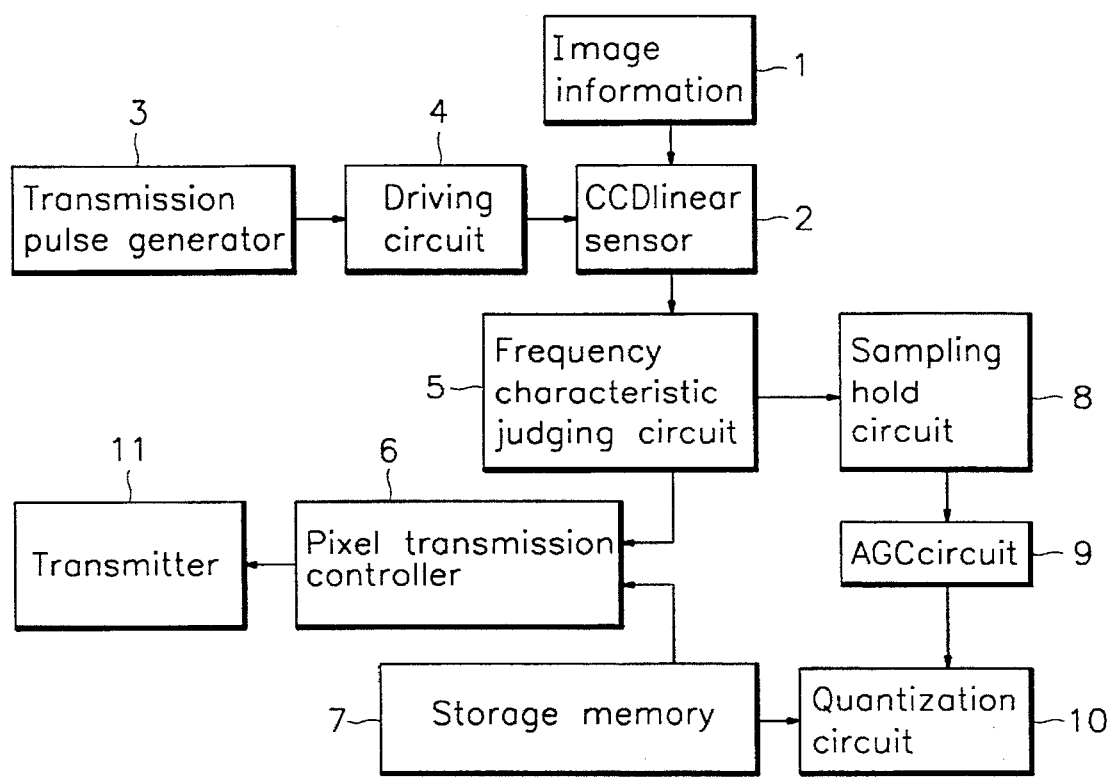
FIG. 1 is a block diagram of a linear sensor camera according to a preferred embodiment of the present invention.
Figure 2:
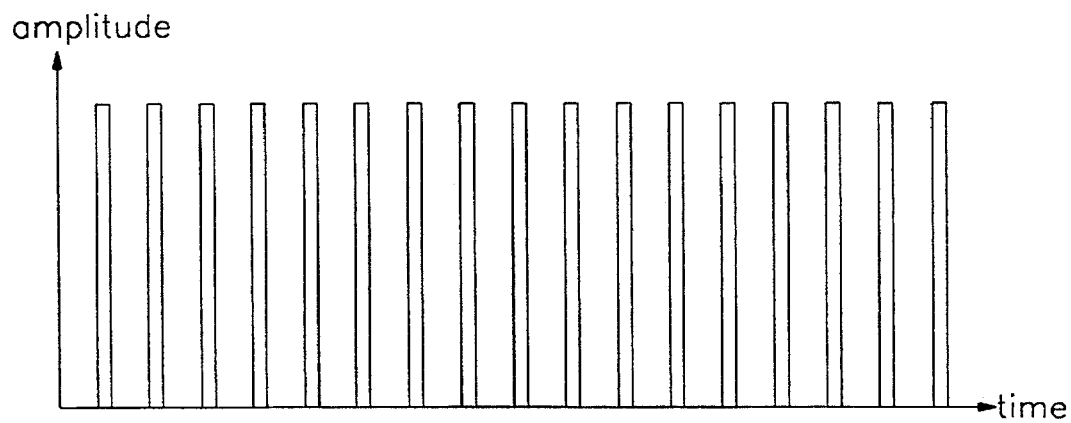
FIG. 2 is a graph of a transmission pulse train generated by the transmission pulse generator in the linear sensor camera of FIG. 1.

A linear sensor according to a preferred embodiment of the present invention is illustrated in FIG. 1. A transmission pulse generator 3 transmits a transmission pulse train having a regular period (e.g., FIG. 2) to a charge coupled device (CCD) linear sensor 2 via a driving circuit 4. The CCD linear sensor 2 receives fixed image information 1, which it samples according to the transmission pulse train from the transmission pulse generator 3, and converts the image information 1 into electric signals.

A frequency characteristic judging circuit 5 receives the electric signals from the CCD linear sensor 2 and, from these signals, determines the spatial frequency modulation of the image information 1. A sample & hold circuit 8 receives the electric signal from the frequency characteristic judging circuit and sends analog signals to an automatic gain control (AGC) circuit 9. The AGC circuit 9 sends the analog signals to a quantization circuit 10. The quantization circuit 10 digitizes the analog signals, which are stored as digitized image information in storage memory 7.

A pixel transmission controller 6 receives the determined spatial frequency modulation of the image information 1 from the frequency characteristic judging circuit 5 and the digitized image information from the storage memory 7. The pixel transmission controller 6 decreases the amount of digitized image information, depending upon the spatial frequency modulation determination by the frequency characteristic judging circuit 5, and transmits the digitized image information to a transmitter 11.

The linear sensor 2 of the present invention can be implemented using a solid state pick-up device, instead of a CCD. For example, the linear sensor 2 can be implemented using a pick-up device which arranges metal oxide semiconductor (MOS) transistors in a matrix array or a contact image sensor which uses an amorphous layer as a photoelectric conversion element.

In a linear sensor such as this, a waveform of the image information (FIGS. 3A and 3B) is processed at regular periods by being sampled by the transmission pulse train (FIG. 2) from the transmission pulse generator 3 (FIGS. 4A and 4B), and then outputted from the CCD linear sensor 2. FIGS. 3A–6B illustrate signals resulting from one scanning period by an electronic scanning of the CCD linear sensor 2. Subscanning of the image information 1 is performed as a mechanical scanning of a fixed pitch by moving the CCD linear sensor 2 itself using a pulse motor or by rotating or moving a mirror and prism arranged in the middle of an image formation optical system.

The frequency characteristic judging circuit 5 determines the spatial frequency modulation of the image information 1, thereby indicating the cycle composition of the image information 1. The spatial frequency modulation is determined either to be low (FIG. 3A) or high (FIG. 3B). The spatial frequency modulation determination is sent from the frequency characteristic judging circuit 5 to the pixel transmission controller 6.

Figure 5A:
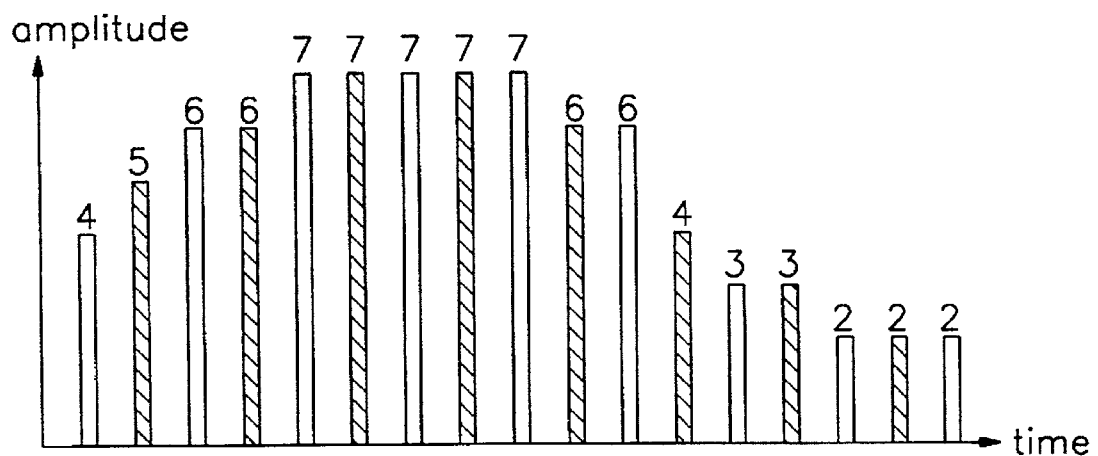
FIGS. 5A and 5B are graphs of digitized signals representing the signals of FIGS. 4A and 4B, respectively.
Figure 6A:
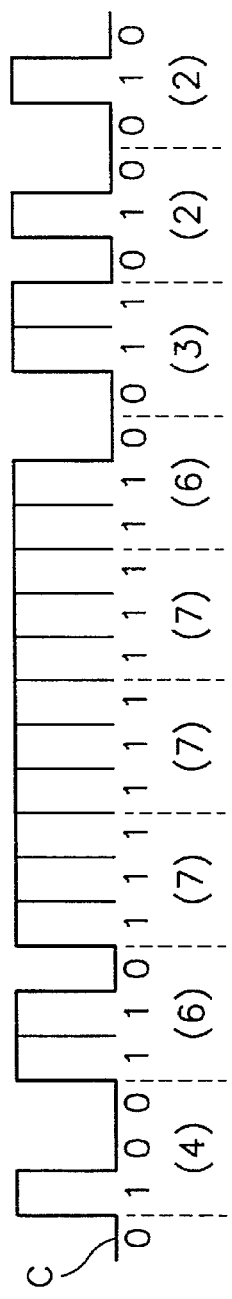
FIGS. 6A and 6B are diagrams of transmission data which respectively encode the digitized signals of FIGS. 5A and 5B.
Figure 6B:
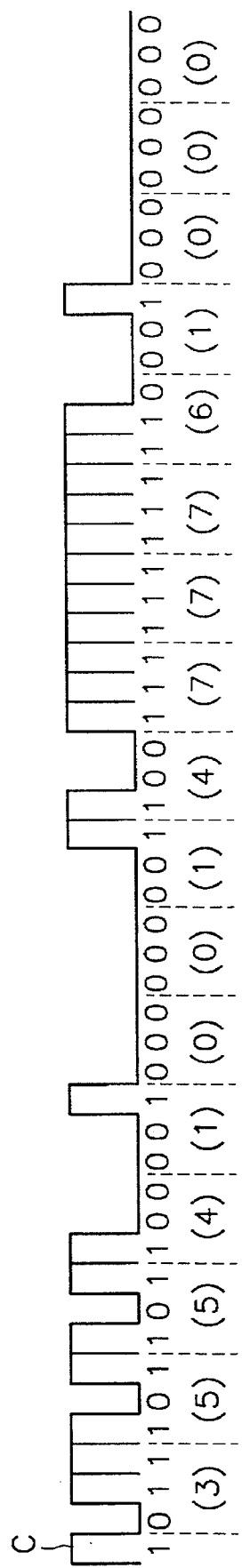

The pixel transmission controller 6 reads the digitized image information for one scanning period from storage memory 7. When the spatial frequency modulation is determined to be low by the frequency characteristic judging circuit 5, the amount of transmitted digitized image information sent to transmitter 11 is decreased; that is, the signals represented by the shaded lines in FIG. 5A are removed, as shown in FIG. 6A. However, when the spatial frequency modulation is determined to be high, the digitized image information is sent to transmitter 11 in the same amount, as shown in FIG. 6O.

In addition, a discriminating code, for example, a "0" or "1" bit, can be added at the head of the digitized image information, so as to indicate whether the amount of digitized image information being outputted has been decreased. The discriminating bit code is depicted at "C" in FIGS. 6A and In the preferred embodiment of the present invention, the spatial frequency modulation has been divided into two types (i.e., low and high), but it could also be divided into three or more types. When the spatial frequency modulation is divided into three or more types, the discriminating code can be comprised of two bits.

In the linear sensor camera of the preferred embodiment, different data processing is performed according to the spatial frequency modulation of the image information 1. The spatial frequency modulation of the image information 1 is determined to be represented, for example, by a waveform having a low spatial frequency modulation like a photo-image (FIG. 3A), or a waveform having a high spatial frequency modulation like a character or graphic image (FIG. 3B).

For a waveform(L) having a low frequency modulation, there is no problem observing an image that has a low resolution. However, for a waveform(H) having a high frequency modulation, it can be difficult to observe an image, if the image does not have a high resolution.

For a waveform(L,H) having a spatial frequency modulation obtained from image information in a document, for example, it is ineffective to acquire the whole document with the same resolution, and this causes a delay in the speed of operation because the quantity of transmission data becomes large. So, as mentioned above, when image information is received in accordance with the present invention, the spatial frequency modulation of the image information is determined, and depending upon the spatial frequency modulation determination, different processing is performed.

Figure 3A:
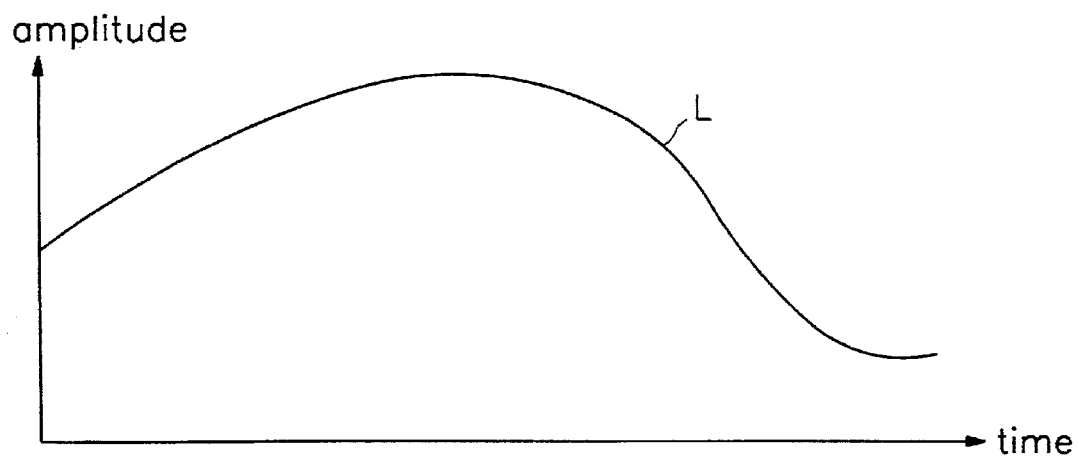
FIGS. 3A and 3B are graphs of image information waveforms respectively having low and high spatial frequency modulations.
Figure 3B:
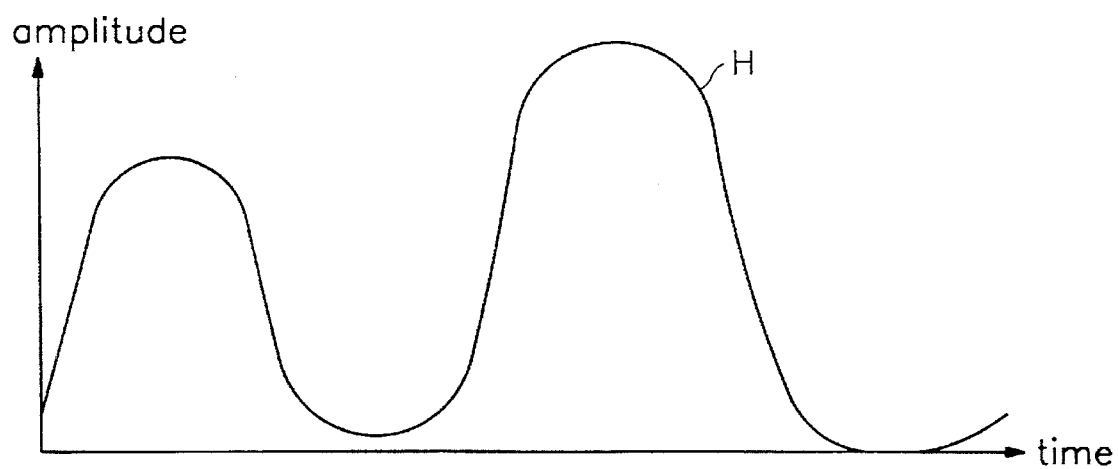
Figure 4A:
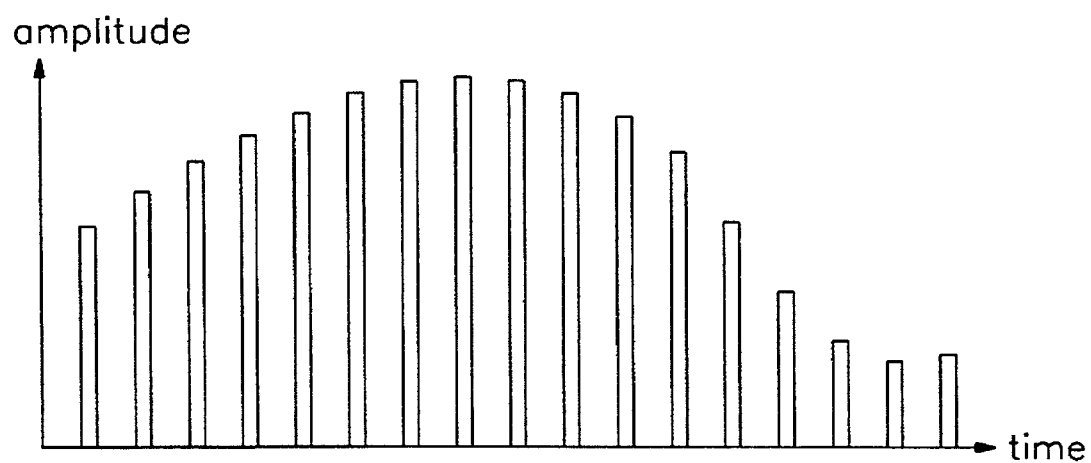
FIGS. 4A and 4B are graphs of signals respectively representing the image information waveforms of FIGS. 3A and 3B sampled according to the transmission pulse train of FIG. 2.
Figure 4B:
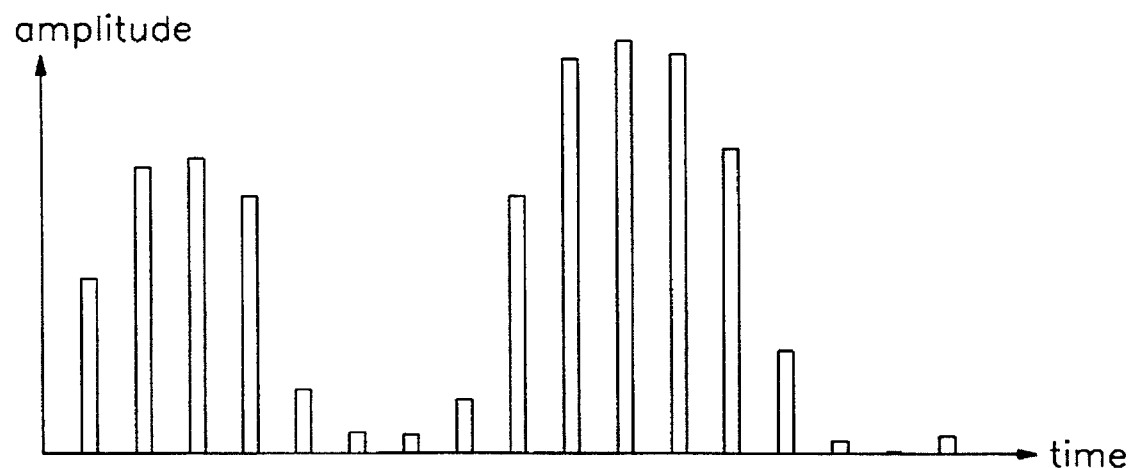

A waveform(L) having a low spatial frequency modulation is illustrated in FIG. 3A. The waveform(L) is sampled by a transmission pulse (FIG. 4A), such as the one illustrated in FIG. 2, and the sampled signal is stored in storage memory 7 during one scanning period as digitized image information of 0's and 1's, encoding, for example, the number "456677777766433222" (FIG. 5A). The pixel transmission controller 6, which has received the determination that the waveform(L) has a low spatial frequency modulation, decreases the amount of digitized image information stored in storage memory 7 by eliminating the shaded parts in FIG. 5A. Whereby, the storage memory 7 stores digitized image information, encoding the number "467776322", which is output by the pixel transmission controller 6 by transmitter 11 (FIG. 6A).

Figure 5B:
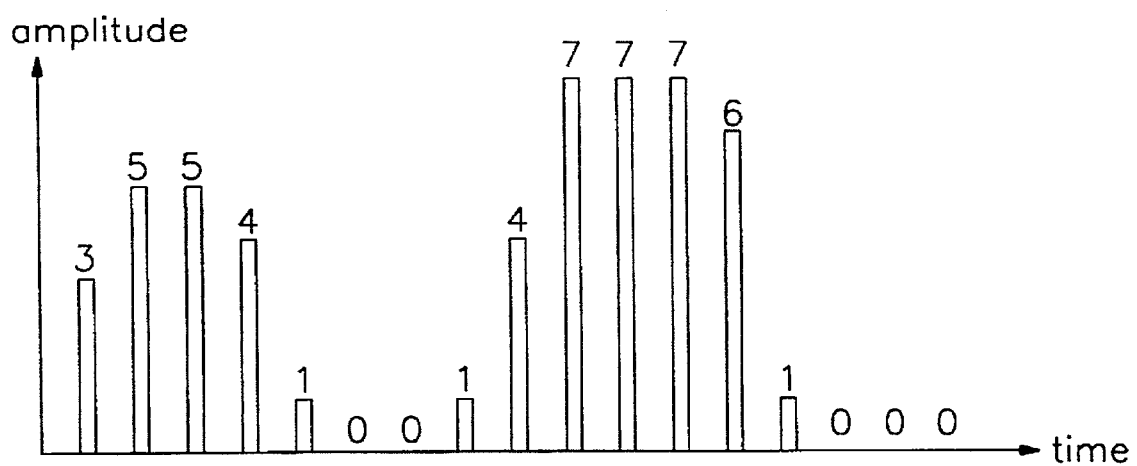

Whereas, a waveform(H) having a high spatial frequency modulation is illustrated in FIG. 3B. The waveform(H) is sampled by a transmission pulse (FIG. 4B), such as the one illustrated in FIG. 2, and the sampled signal is stored in storage memory 7 during one scanning period as digitized image information of 0's and 1's, encoding, for example, the number "355 410 014 777 610 00" (FIG. 5B). The pixel transmission controller 6, which has received the determination that the waveform(H) has a high spatial frequency modulation from frequency characteristic judging circuit 5, outputs the digitized image information from the storage memory 7 as transmission data, without reduction. When the digitized image information is output, a discriminating code, for example, "1" meaning that the digitized image information has not been decreased, is transmitted as a header for the transmission data. When outputting digitized image information that has been decreased, plural image information obtained by subscanning, for example, need not be output, thereby decreasing (or compressing) the digitized image information at prescribed intervals.

In the case where the spatial frequency modulation is divided into three or more types, the amount of digitized image information outputted corresponds to the type of spatial frequency modulation. When transmission data having a low spatial frequency modulation (FIG. 6A) is compared to transmission data having a high spatial frequency modulation (FIG. 6B), it can be seen that the signal quantity for the low spatial frequency modulation transmission data is less than the signal quantity for the high spatial frequency modulation transmission data; that is, the signal quantity is less regardless of the image information for the same amount of scanned data.

So, for image information having a low spatial frequency modulation, the linear sensor camera can effectively decrease (compress) the transmission data quantity, and thus, data processing of the transmission data by transmitter 11 can be performed in less time.

In the preferred embodiment of the present invention, the spatial frequency modulation is determined from the image information 1. It does not matter whether the spatial frequency modulation determination is made for each unit block of a target, for example, a document divided into a plurality of blocks.

As previously mentioned, the preferred embodiment of the invention has the following effects:

(1) According to the processing technique of the transmission data, a quantity of transmission data can be decreased effectively, and the processing speed of the transmission data by transmitter 11 is improved when the image information has a low spatial frequency modulation.

(2) Also, the present invention is useful in a small device, like a camera, because it can improve the processing speed of the data without requiring complex processing or large memory capacity.

(3) When the digitized image information is to be outputted in compressed form, and this digitized image information represents plural image information, the transmission data can be decreased even more with further improvement in processing speed.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A linear camera comprising:

image information conversion means for receiving image information, electronically scanning the image information, and converting the scanned image information into an electric signal having a regular period;

frequency characteristic judging means for determining whether a spatial frequency of the electric signal output from the image information conversion means for one scanning period is low or high;

means for changing a quantity of the electric signal according to the spatial frequency determination by the frequency characteristic judging means; and means for outputting the electric signal in the quantity as changed by the changing means.

2. The linear camera as defined in claim 1, wherein the changing means comprises means for decreasing the quantity of the electric signal when the spatial frequency of the electric signal is determined to be low.

3. The linear camera as defined in claim 2, wherein the changing means comprises means for keeping the quantity of the electric signal at a same quantity when the spatial frequency of the electric signal is determined to be high.

4. The linear camera as defined in claim 3, further including means for attaching a code to the electric signal to indicate whether the quantity of the electric signal was changed by the changing means.

5. The linear camera as defined in claim 1, wherein the changing means comprises means for keeping the quantity of the electric signal at a same quantity when the spatial frequency of the electric signal is determined to be high.

6. The linear camera as defined in claim 1, further including means for attaching a code to the electric signal to indicate whether the quantity of the electric signal was changed by the changing means.

7. A method for processing transmission data of a linear sensor camera, comprising the steps of:

receiving image information;

converting the image information into an electric signal of a regular period;

determining a spatial frequency modulation of the image information for one scanning period;

digitizing the electric signal to generate a digitized signal;

changing an amount of the digitized signal according to the spatial frequency modulation determined in the determining step; and outputting the digitized signal from the linear sensor camera as the transmission data in the amount as changed in the changing step.

* * * * *